United States Patent
Bohnet

(10) Patent No.: US 9,658,999 B2
(45) Date of Patent: May 23, 2017

(54) LANGUAGE PROCESSING METHOD AND ELECTRONIC DEVICE

(71) Applicant: Sony Corporation, Minato-ku (JP)

(72) Inventor: Bernd Bohnet, Tuebigen (DE)

(73) Assignee: SONY CORPORATION, Tokyo (JP)

( * ) Notice: Subject to any disclaimer, the term of this patent is extended or adjusted under 35 U.S.C. 154(b) by 629 days.

(21) Appl. No.: 14/173,011

(22) Filed: Feb. 5, 2014

(65) Prior Publication Data

US 2014/0249800 A1 Sep. 4, 2014

(30) Foreign Application Priority Data

Mar. 1, 2013 (EP) ..................................... 13001049

(51) Int. Cl.
*G06F 17/27* (2006.01)
*G10L 15/193* (2013.01)
*G10L 15/18* (2013.01)

(52) U.S. Cl.
CPC ........ *G06F 17/2705* (2013.01); *G06F 17/274* (2013.01); *G06F 17/2785* (2013.01); *G10L 15/1822* (2013.01); *G10L 15/193* (2013.01)

(58) Field of Classification Search
CPC . G10L 15/1822; G10L 15/193; G10L 15/183; G10L 15/19; G10L 15/22; G06F 17/2785; G06F 17/274; G06F 17/271; G06F 17/277; G06F 17/2755; G06F 17/212; G06F 17/2725; G06F 17/2765; G06F 17/289; G06F 17/30861
USPC .......................... 704/9, 257, 275, 270, 240, 4
See application file for complete search history.

(56) References Cited

U.S. PATENT DOCUMENTS

| | | | |
|---|---|---|---|
| 4,464,650 A | 8/1984 | Eastman et al. | |
| 7,627,817 B2 * | 12/2009 | Travieso | G06F 17/289 715/234 |
| 7,685,083 B2 | 3/2010 | Fairweather | |
| 2004/0059566 A1 * | 3/2004 | Fogel | G06F 17/2705 704/9 |
| 2007/0016398 A1 * | 1/2007 | Buchholz | G06F 17/2705 704/4 |
| 2007/0112714 A1 | 5/2007 | Fairweather | |

(Continued)

FOREIGN PATENT DOCUMENTS

WO 03/003241 A1 1/2003

OTHER PUBLICATIONS

Wolfgang Seeker, et al., "Informed ways of improving data-driven dependency parsing for German", Coling, Poster Volume, Aug. 2010, pp. 1122-1130.

(Continued)

*Primary Examiner* — Vijay B Chawan
(74) *Attorney, Agent, or Firm* — Oblon, McClelland, Maier & Neustadt, L.L.P.

(57) ABSTRACT

A language processing method is provided comprising forming a feature from at least one word from an input sequence of words; generating an address of a memory cell storing a weight for the feature based on a hash function using the feature as argument; retrieving the weight for the feature from the memory cell with the address; and generating a dependency tree for the input sequence based on the weight and a second order dependency parsing algorithm. A corresponding electronic device is provided as well.

12 Claims, 3 Drawing Sheets

(56) References Cited

U.S. PATENT DOCUMENTS

| | | | | |
|---|---|---|---|---|
| 2008/0177531 A1* | 7/2008 | Nakagawa | .......... | G06F 17/2715 704/9 |
| 2009/0030686 A1* | 1/2009 | Weng | .................. | G10L 15/1822 704/240 |
| 2012/0290288 A1* | 11/2012 | Ait-Mokhtar | ......... | G06F 17/271 704/9 |
| 2014/0019122 A1* | 1/2014 | New | .................. | G06F 17/2765 704/9 |

OTHER PUBLICATIONS

Xavier Lluís, et al., "A Second-Order Joint Eisner Model for Syntactic and Semantic Dependency Parsing", Conll Proceedings of the Thirteenth Conference on Computational Natural Language Learning: Shared Task, 2009, 6 pages.

* cited by examiner

LANGUAGE PROCESSING METHOD AND ELECTRONIC DEVICE

BACKGROUND

Field of the Disclosure

The present disclosure relates to a language processing method and an electronic device for language processing.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Language processing methods segment a user utterance into sentences and the sentences into tokens, e.g. words or phrases. Syntax parsers use the tokens to determine a syntactical structure in the sentence. Thereby the syntax parsers use algorithms based on a grammar that describes the syntactical relationships between the words of a sentence. The grammar is embodied by a plurality of production rules, wherein each production rule corresponds to a grammatical rule that describes how pairs of words and multi-word phrases can be combined with each other to obtain multi-word phrases of a certain phrase type. A grammatically correct sentence can be represented by a parse tree.

Dependency parsing or dependency grammar (DG) is a class of modern syntactic theories that are all based on a dependency relation. The dependency relation views the (finite) verb as the structural center of all clause structures. All other syntactic units (e.g. words) are either directly or indirectly dependent on the verb. Dependency grammars are distinct from phrase structure grammars (=constituency grammars), since DG lack phrasal nodes. Structure is determined by the relation between a word (a head) and its dependents. Dependency structures are flatter than constituency structures in part because they lack a finite verb phrase constituent, and they are thus well suited for the analysis of languages with free word order, such as Czech and Turkish.

Currently, dependency parsers need a large memory and sometimes long computing times. It is an object of the embodiments to provide an improved natural language processing method and an electronic device for improved natural language processing.

SUMMARY

An embodiment refers to a language processing method. The language processing method uses a parsing processor and comprises forming a feature from at least one word from an input sequence of words; generating an address of a memory cell storing a weight for the feature based on a hash function using the feature as argument; retrieving the weight for the feature from the memory cell with the address; and generating a dependency tree for the input sequence based on the weight and a second order dependency parsing algorithm.

Another embodiment refers to an electronic device comprising a parsing processor configured to form a feature from at least one word from an input sequence of words; a memory including a memory cell storing a weight for a feature; wherein the parsing processor is further configured to generate an address of the memory cell storing a weight for the feature based on a hash function using the feature as argument; to retrieve the weight for the feature from the memory cell with the address; and to generate a dependency tree for the input sequence based on the weight and a second order dependency parsing algorithm.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
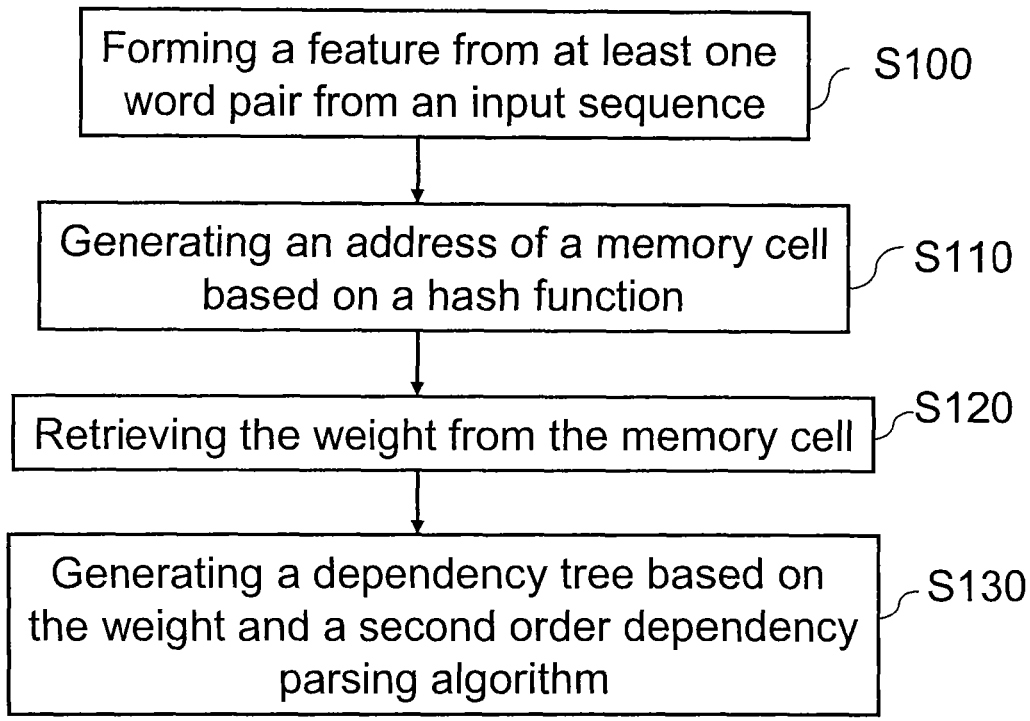
FIG. 1 shows schematically a flow diagram of a language processing method according to an embodiment of the invention.

Referring now to the drawings, wherein like reference numerals designate identical or corresponding parts throughout the several views, FIG. 1 illustrates a schematic flow diagram of a language processing method according to an embodiment of the invention.

In S100 a feature is formed from at least one word from an input sequence of words.

The term "feature" is used in machine learning for depicting a property of an entity extracted from an underlying input source. A feature might be elementary or composed from other elementary features. For instance, inputs to a parser might be the word forms of a sentence (which corresponds to the input sequence of words), the part-of-speech tags assigned to the word forms, etc. Elementary features are for instance 'noun', 'verb', 'adjective', 'determiner', etc. Composed features are built due to templates such as "word-form+part-of-speech": "a+determiner", "bank+noun". In dependency parsing features are composed of candidate parts since the parser has to decide, if it has to build an edge between two words or the word pair, e.g. part-of-speech (candidate-head)+part-of-speech (candidate-child), e.g. noun (head)+determiner (dependent).

An address of a memory cell storing a weight for the feature is generated based on a hash function using the feature as argument in S110.

The weight might be interpreted as a value assigned by a (discriminative) machine learning technique such as Support Vector Machines (SVMs) to a distinct feature. Machine learning algorithms are able to acquire meaningful weights during a learning phase—some techniques provide probabilities (generative techniques). For instance, "a+determiner" might have a weight of 1.2 because the word 'a' is a determiner and seen by the learning algorithm in the training phase and the weight for "house+adjective" might be −0.2, because a "house" is no "adjective". In parsing, the features such as 'noun'→'determiner' might have a positive weight and a lexicalized features such as 'house'+determiner as well but a feature such as 'adjective'→'determiner' might have a negative weight since an edge between an adjective and a determiner would lead to a wrong dependency tree.

The weights may be kept as a large list that contains usually several million entries. To find the weight for a feature in the list, it is possible to use a look-up-table. The look-up-table is usually implemented as a hash table. This look-up-table might be stored in a memory as a list of pairs: (feature, address-of-weight). To find a weight is relatively slow since the algorithm has to look up a large number of values in the main memory at pseudo random locations. The access of values at pseudo random locations is one of the most time consuming operations since memory access is optimized by a pre-fetch unit to read a sequence into the cache lines of the CPU. The hash function or hash kernel uses instead of a look-up-table a mathematical function to find the weight of the feature in the weight vector. This is faster since the look-up-table in the main memory is no longer needed and it is avoided to access the main memory at pseudo random places for the mapping of a feature to the address of the weights. The hash function takes as argument the features and computes the address of the weight.

Since there is no optimal solution for such a hash function, a hash function might be applied that distributes the weights deterministically to places in a given space of numbers. The function seems to determine the places randomly but works of course deterministically which means that with the same argument it computes the same place and it is possible to quickly find the place where the weight is stored.

In S120 the weight for the feature is retrieved from the memory cell with the address that is generated based on the hash function.

Afterwards in S130 a dependency tree for the input sequence is generated based on the weight and a second order dependency parsing algorithm.

A score might be computed as a sum of the weights given to the features (e.g. word categories as verb, noun, adjective of the head and child, Verb→Noun etc.) as in a perceptron algorithm as disclosed e.g. in Rosenblatt "The perceptron: A probabilistic model for information storage and organization in the brain", Psychological Review, Vol. 65, No. 6, 1958.

The dependency tree might be generated by looping over all adjacent features and combining those two features with the highest score and storing those in a data structure (chart). For instance, the score of an edge could be the sum of the weights: score=weight(head-word)+weight(dependent-word)+weight(head-pos)+weight (dependent-pos∥head-pos) etc.

In linguistic, a dependency tree is formally a tree that is defined over the words of a sentence.

Figure 2:
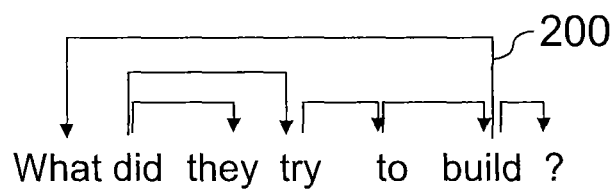
FIG. 2 illustrates schematically the final dependency tree for a sentence.

The words of a sentence $w_1 \ldots w_n$ are the nodes of a (labeled) directed tree, i.e., the subset $$T \subset W \times W \times L$$

is the dependency as formal definition, where W is the set of words of a sentence and L are a set of edge labels representing the syntactic categories such as L={subject, object, modifier, . . . }. The input is annotated in addition usually with the category of the words such as Verb (V), Noun (N), Adjective (A), etc. In FIG. 2 a dependency tree is illustrated with edges 200 but without edge labels. The parent node of tree is also called the head of the tree.

A dynamic programming approach to parsing may first search a possible solution for all adjacent word pairs of the input sentence, e.g. (what did), (did they), (they try), etc. Here the parsing algorithm has to decide what direction the edge has, e. g. (did→they) or (did←they). It should be noted that the algorithm might suggest a sub-solution which later might not contribute to the final solution such as the edge (they→try) which should not be part of a correct tree. Hence, it is not sufficient to build only pairs of adjacent words. Some edges span over a larger number of words, e. g., did . . . try, and so larger parts have to be considered. Therefore, in the next steps larger spans of three words and then stepwise up to the number of words in the sentence are built. For these cases, the parsing algorithm repeats the previous steps, it searches and stores the optimal solutions for each of this larger number of adjacent words. The results of each step are stored in a data structure called chart. This procedure composes with two operations spans to bigger spans of the desired length in each iteration step.

The idea of this procedure is to compose trees efficiently by adjacent joining elements. A tree is defined that it has a left and right sub-tree. The procedure introduced by Eisner (1996) is especially efficient since the head has to be on the left or the right and no loop is needed that considers all nodes in-between.

Figure 3:
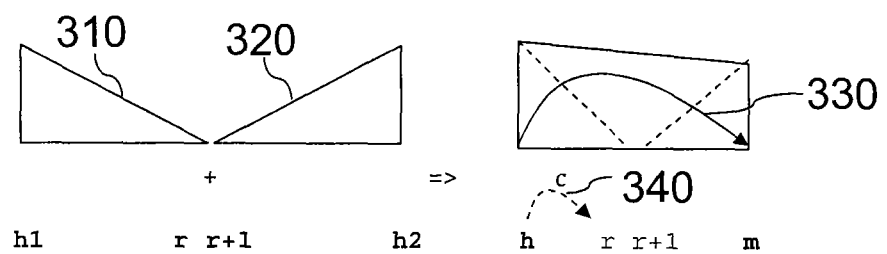
FIG. 3 illustrates schematically the combination of two sub-trees to an open span.

When the algorithm has to combine two adjacent sub trees, an edge between these sub-trees has to be introduced. This is illustrated usually graphically as depicted in FIG. 3. Two trees 310, 320 are combined which have a head h right and the other one left. The algorithm can combine trees via a new edge 330 which is called open span since it is not yet complete tree. As contextual information to build the trees, one additional edge is used in this algorithm marked below on the right of the graphic with the dash arrow 340 which is the closest child of the head node h.

FIG. 3 shows the dynamic programming structures applied in the parsing algorithm to build larger spans. The variables in bold face are the indices of the entry in the data structure used to store sub-solutions (chart). The algorithm built from two closed spans a new open span. An open span is associated to a dependency edge (h,m,label) while a closed span is associated with a dependency (sub) tree. This parsing method was suggested by (Eisner, 1996; McDonald, et. al. 2005).

Figure 4:
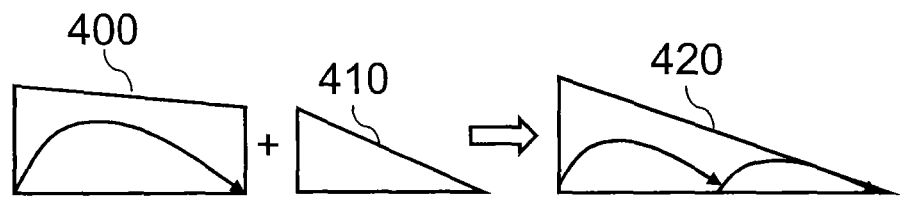
FIG. 4 illustrates schematically the generation of a closed span from an open span and a tree.

As it is depicted in FIG. 4, afterwards a closed span is composed out of a data structure of an edge (open span 400) and a tree 410 another tree 420 (covering more words).

Figure 5:
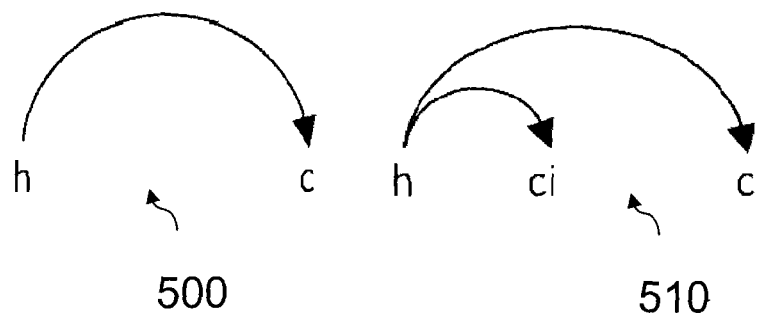
FIG. 5 shows schematically dependencies for a first order and a second order dependency algorithm.

A second order dependency parsing algorithm considers up to two edges to build a feature and, therefore, it is more accurate and concise since it considers more context. A feature of such a part could contain information such as the category of the head h, the child c and another child c, between the head and the child as depicted exemplarily in FIG. 5 for the second order parsing algorithm 510 as compared to a first order algorithm 500.

The combination of a hash function with a second order parsing algorithm as explained above leads to a significant faster parsing time and to reduced memory needs. The hash function or hash kernel provides the possibility to set the needed memory by a parameter. This gives the opportunity to use the parsing algorithm in devices that provide only a small amount of main memory without any implementation changes. However, the amount of needed memory can be set to any value between 1 and maximal allowed values for indexes, practical values are between 10.000 and several hundred millions.

According to a further embodiment an edge labelling is carried out during an additional loop over the edges while the algorithm composes parts. This integrated edge labelling provides to an empirical test higher accuracy for the edge labels and also a higher accuracy for identifying the correct parent node (head) compared to the standard algorithms which carry out the labelling as a separate method after the dependency tree has been built completely.

According to a further embodiment the weights are created and the scores are cached in a cache memory or in the main memory. A faster processing is obtained since the scores are needed several times during the algorithm.

It is also possible to compute the weights when needed.

Further it is possible to switch between caching the weights and calculating them when needed depending on memory conditions. With this option it can be decided whether faster processing times or reduced memory requirements are more important.

Standard parsers use a lexicon to map values to indexes from 1 . . . n that become later parts of features (such as words, categories of words, etc.). These indexes are used to compose the feature efficiently. n is the maximal number of different observed values in the training data. This means for instance if n distinct different words forms are present in the training corpus, a lexicon of n entries is used which needs a large amount of main memory. According to a further embodiment, a hash function is used to map the words directly to a number in a range defined and get rid of the lexicon that allows to reduce the memory requirement with a small trade-off towards accuracy.

The proposed embodiment can be combined in a language processing method resulting in a parser which performs dependency parsing in a memory efficient fashion with high accuracy, low memory requirement and time efficiency, while it is flexible configurable in these dimensions which enables to choose between higher speed, required memory and parsing accuracy. This provides the opportunity to use the parsing method on small electronic devices with low memory, such as, for instance but not restricted to, cellular phones, smart phones, tablet personal computers, personal digital assistants (PDAs), laptop computers etc.

Figure 6:
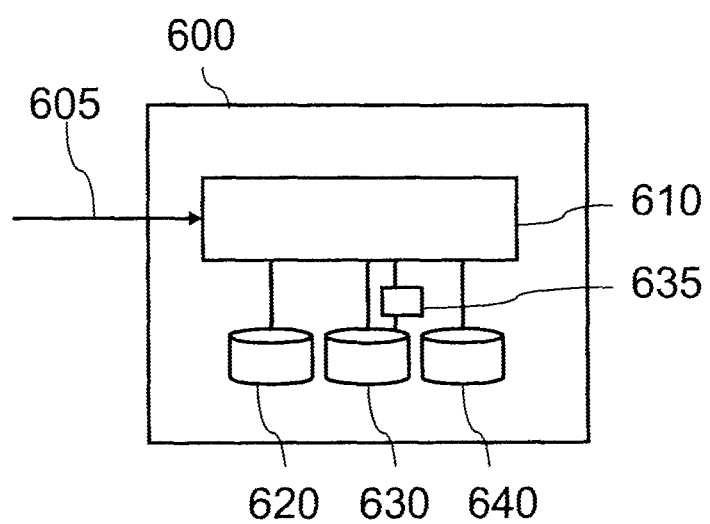
FIG. 6 shows schematically a block diagram of an electronic device according to an embodiment of the invention.

FIG. 6 is a hardware diagram of an electronic device 600 embodying aspects of this disclosure.

The electronic device 600 includes a parsing processor 610 configured to form a feature from at least one word from an input sequence 605 of words; a memory 620 including a memory cell storing a weight for a feature; wherein the parsing processor 610 is further configured to generate an address of the memory cell storing a weight for the feature based on a hash function using the feature as argument; to retrieve the weight for the feature from the memory cell with the address; and to generate a dependency tree for the input sequence 605 based on the weight and a second order dependency parsing algorithm.

The electronic device might be realized, for instance, as a smartphone, a tablet computer, a laptop, a computer, a video camera, a voice recorder etc. It might include a microphone for converting speech or utterances into electrical signals and e.g. for storing them in a memory of the electronic device. The speech might be parsed by the parsing processor 610, e.g. directly from the input of the microphone. It is also possible to use the parsing processor 600 for parsing speech or utterances that were stored beforehand. Further, in one embodiment the parsing processor 600 could be used to develop dependency trees for analyzing written texts.

The language processing method might as well be used e.g. in a smartphone, a tablet computer, a laptop, a computer, a video camera, a voice recorder etc., for instance equipped with a microphone for converting speech and/or utterances into electrical signals. It might be used as well for deriving dependency trees for analyzing written texts.

After the dependency tree has been build, it might be used to e.g. find a response to an uttered question, to search data bases based on information derived from the dependency tree or to generate electrical signals to control machines or other equipment simply by uttering commands.

A main memory 630 might also be included in the electronic device 600 and a selection unit 635 adapted to select a reserved part of the main memory 630 based on a parameter.

The electronic device 600 might further include a cache memory 640 wherein the parsing processor 610 is further configured to generate a score for an edge of the dependency tree based on a sum of the weights of the features in the dependency tree; to store the score in the cache memory 640; and to retrieve the score from the cache memory 640 when generating the score for the same edge again.

According to a further embodiment the parsing processor 610 might be further adapted to generate an edge in the dependency tree; and to generate edge labels before a next edge is generated.

The parsing processor 610 might be further adapted to associate an index with each word of a training corpus in a training phase; and to generate the index for a word of the input sequence based on a hash function using the word as argument.

The processes, algorithms and electronically driven systems described herein can be implemented via a discrete control device or computing system consistent with the structure shown in FIG. 6. Such a system is described herein as an electronic device.

The memory 620, the main memory 630 and the cache memory 640 might be provided separately or might be implemented in a single memory (e.g. the main memory of the electronic device 600). The memory might be realized as ROM, EPROM, EEPROM, flash memory, static memory, DRAM, SDRAM, and their equivalents.

The parsing processor 610 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The parsing processor 610 can be a separate device or a single processing mechanism. Further, this disclosure can benefit from parallel processing capabilities of a multi-cored CPU.

The above-noted components can be coupled to a network, such as the Internet or a local intranet, via a network interface for the transmission or reception of data, including controllable parameters. The network provides a communication path to a mobile device, which can be provided by way of packets of data. Additionally, a central BUS is provided to connect the above hardware components together and provides at least one path for digital communication there between.

Obviously, numerous modifications and variations of the present disclosure are possible in light of the above teachings. It is therefore to be understood that within the scope of the appended claims, the invention may be practiced otherwise than as specifically described herein.

CROSS-REFERENCE TO RELATED APPLICATIONS

The present application claims priority of EP patent application No. 13 001 049.9 filed on 1 Mar. 2013, the entire contents of which are incorporated herein by reference.

The invention claimed is:

1. A language processing method using a parsing processor comprising:
receiving, via a microphone, an audio input including an input sequence of words;
converting the audio input to an electrical signal including the input sequence of words;
forming a feature from at least one word from the input sequence of words of the electrical signal;
determining a weight for the feature based at least on whether the feature is a first type of feature or a second type of feature, wherein the weight is determined to have a positive value for a first type of feature and a negative value for a second type of feature;
generating an address of a memory cell storing the weight for the feature based on a hash function using the feature as argument;
retrieving the weight for the feature from the memory cell with the address; and
generating a dependency tree for the input sequence based on the weight and a second order dependency parsing algorithm.

2. The language processing method according to claim 1 further comprising:
selecting a reserved part of a main memory by a parameter.

3. The language processing method according to claim 1 further comprising:
generating a score for an edge of the dependency tree based on a sum of the weights of the features in the dependency tree;
storing the score in a cache memory; and
retrieving the score from the cache memory when generating the score for the same edge again.

4. The language processing method according to claim 3 further comprising:
selecting between a first mode in which the score is stored in the cache memory and retrieved from it and a second mode in which the score is generated based on the sum of the weights of the features.

5. The language processing method according to claim 1 further comprising:
generating an edge in the dependency tree; and
generating edge labels before a next edge is generated.

6. The language processing method according to claim 1 further comprising:
associating an index with each word of a training corpus in a training phase; and
generating the index for a word of the input sequence based on a hash function using the word as argument.

7. A non-transitory computer-readable medium including instructions that, when executed by one or more processors, cause the one or more processors to perform a method comprising:
receiving, via a microphone, an audio input including an input sequence of words;
converting the audio input to an electrical signal including the input sequence of words;
forming a feature from at least one word from the input sequence of words of the electrical signal;
determining a weight for the feature based at least on whether the feature is a first type of feature or a second type of feature, wherein the weight is determined to have a positive value for a first type of feature and a negative value for a second type of feature;
generating an address of a memory cell storing the weight for the feature based on a hash function using the word pair as argument;
retrieving the weight for the feature from the memory cell with the address; and
generating a dependency tree for the input sequence based on the weight and a second order dependency parsing algorithm.

8. An electronic device comprising:
a memory including a plurality of memory cells;
a microphone configured to receive an audio input including an input sequence of words;
a converter configured to convert the audio input to an electrical signal including the input sequence of words;
a parsing processor configured to:
form a feature from at least one word from the input sequence of words of the electrical signal;
determine a weight for the feature based at least on whether the feature is a first type of feature or a second type of feature, wherein the weight is determined to have a positive value for a first type of feature and a negative value for a second type of feature;
generate an address of a memory cell from the plurality of memory cells storing the weight for the feature based on a hash function using the feature as argument;
retrieve the weight for the feature from the memory cell with the address; and
generate a dependency tree for the input sequence based on the weight and a second order dependency parsing algorithm.

9. The electronic device according to claim 8, further comprising:
a main memory; and
a selector configured to select a reserved part of the main memory based on a parameter.

10. The electronic device according to claim 8, further comprising:
a cache memory;
wherein the parsing processor is further configured to:
generate a score for an edge of the dependency tree based on a sum of the weights of the features in the dependency tree;
store the score in the cache memory; and
retrieve the score from the cache memory when generating the score for the same edge again.

11. The electronic device according to claim 8, wherein the parsing processor is further configured to:
generate an edge in the dependency tree; and
generate edge labels before a next edge is generated.

12. The electronic device according to claim 8 wherein the parsing processor is further configured to
associate an index with each word of a training corpus in a training phase; and
generate the index for a word of the input sequence based on a hash function using the word as argument.

* * * * *